Dec. 23, 1924.  
R. F. CRAWFORD  
1,520,562  
POWER TAKE-OFF DEVICE FOR MOTOR VEHICLES  
Filed March 14, 1923 2 Sheets-Sheet 1
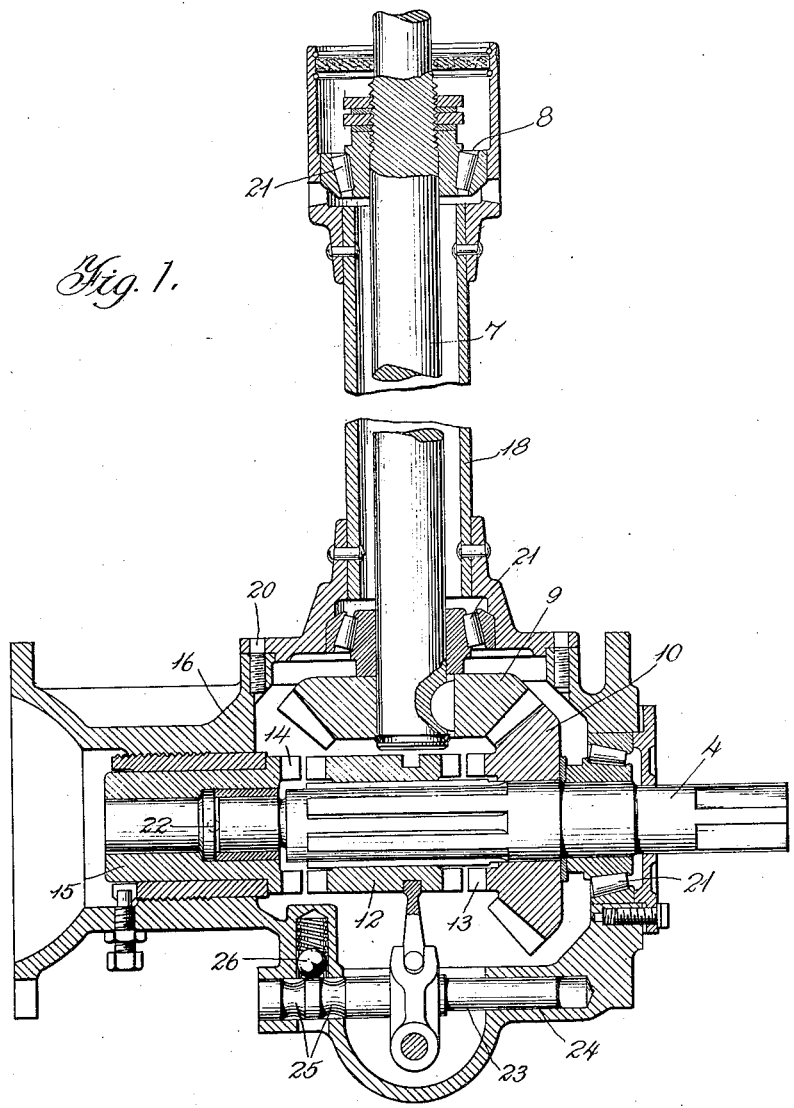

Patented Dec. 23, 1924.

1,520,562

UNITED STATES PATENT OFFICE.

RALPH F. CRAWFORD, OF SALINA, KANSAS.

POWER-TAKE-OFF DEVICE FOR MOTOR VEHICLES.

Application filed March 14, 1923. Serial No. 625,054.

*To all whom it may concern:*

Be it known that I, RALPH F. CRAWFORD, a citizen of the United States, residing at Salina, in the county of Saline and State of Kansas, have made a certain new and useful invention in Power-Take-Off Devices for Motor Vehicles, of which the following is a specification.

This invention relates to power take-off devices for motor vehicles, whereby power from an automobile engine may be transmitted to any machinery to be driven; such devices including clutch means for selectively applying the power to the take off means or to the means for propelling the vehicle.

The object of the invention is to provide improved means of this character which shall be light, compact and adaptable to sound motor car designing.

The invention consists in the novel construction and combination of parts, as hereinafter set forth.

Figure 3:
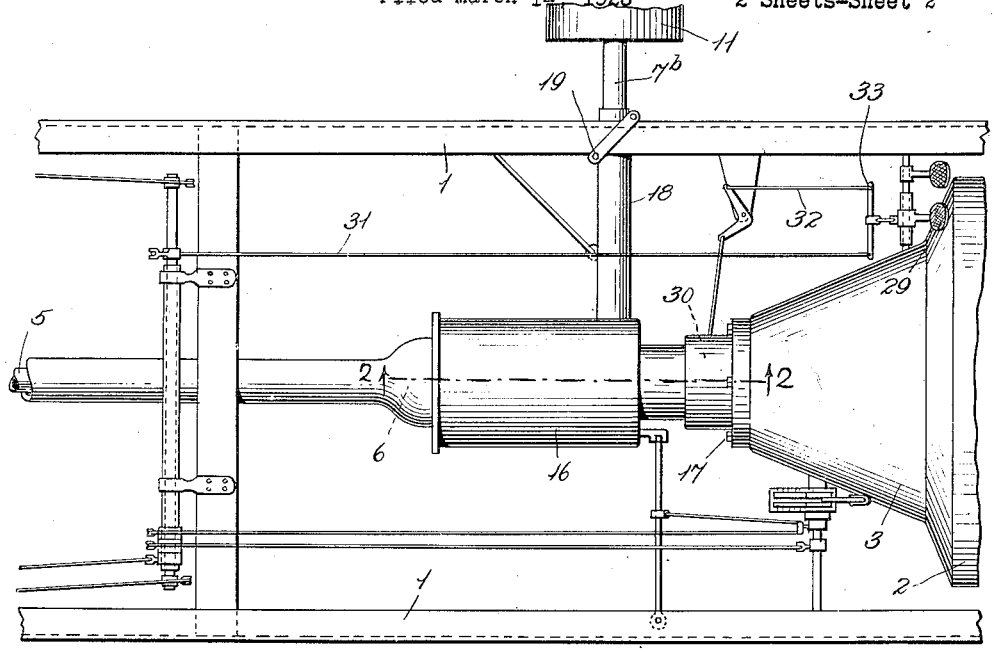
Figure 2:
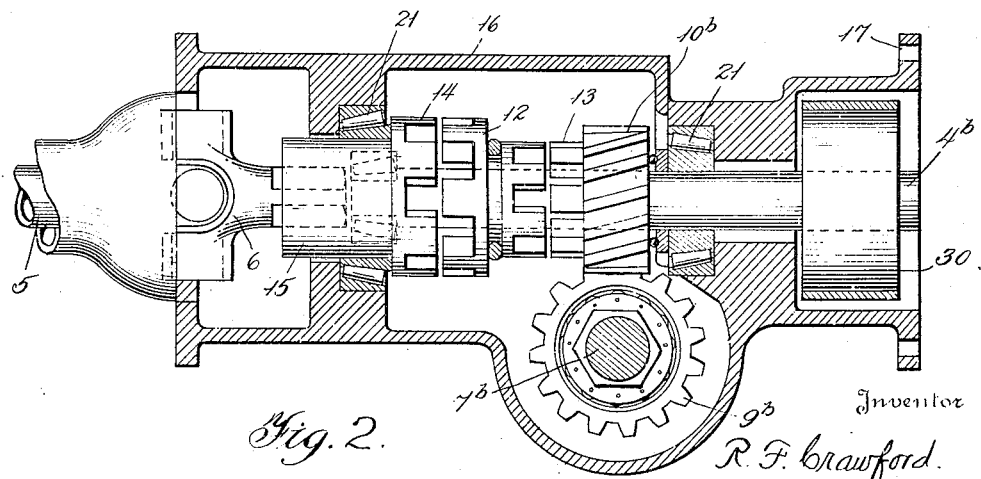

In the accompanying drawings, illustrating an embodiment of the invention, Figure 1 is a central horizontal section of the invention; Figure 2 is a section on the line 2—2, Figure 3, and Figure 3 is a plan view of the invention as applied.

In these drawings the numeral 1 designates the longitudinal channel beams forming part of the vehicle frame; 2 the engine casing, and 3 the housing for the transmission gearing, all of these parts being of the usual construction.

The vehicle drive shaft comprises a short forward section 4, rigidly secured to the driven shaft of the transmission gearing, and a rear section 5 having universal joint connection 6 with the forward section and terminating in the usual differential gear connection. A transverse countershaft 7 has bearings 8 secured to the frame beam 1 at one side of the car, a bevel gear 9 being rigidly mounted upon the inner end of said countershaft and meshing with a bevel gear 10, loosely mounted upon the drive shaft section 4. A belt wheel 11 or other power transmitting device is secured upon the free end of shaft 7.

Clutch member 12 is slidably mounted to rotate with shaft section 4, and is movable from a central neutral position forwardly into clutching engagement with a clutch element 13 of the gear 10 to actuate the take-off devices, or movable from neutral position rearwardly into clutching engagement with a clutch element 14 of the forward socket member 15 of the universal joint 6 to establish the usual drive connection with the rear wheels of the car.

Shaft section 4, with the gears 9 and 10 and members 12, 13, 14 and 15, forming what may be termed a supplemental transmission device, are inclosed in a housing 16, bolted at 17 to the rear end of the main transmission housing 3. Shaft 7 is inclosed in a sleeve 18, secured to the frame 1 at 19 and bolted at 20 to the housing 16. The shafts 4 and 7 are provided with roller bearings 21, supported in the housing 16 and sleeve 18, and with thrust bearings 22, as shown.

By keeping the diameter of the clutch elements 12, 13 and 14 less than that of the gear 10, the entire clutch mechanism may be contained in the space opposite gear 9, thus permitting the supplemental transmission device to be of very compact character, the entire housing 16, in the design illustrated in Figure 1, extending but a few inches in rear of the housing 3 and being readily supported therefrom. Another advantage of the compact nature of the device is that the universal joint 6 is positioned nearly as far forward as in the usual automobile construction, and the angle of the drive shaft section 5 is thus very little altered.

In order to maintain the clutch member 12 exactly in position engaging the clutch element 13 or 14, so that the total throw of the clutch may be reduced to a minimum, the draw bar 23 of the clutch, which is mounted in bearings 24 of the housing 16, is notched at 25, said notches being designed to be engaged by a spring-pressed member 26, also mounted in said housing. Movement of the draw bar 23 may be controlled as in my Patent No. 1,379,534, wherein the vehicle brakes are operated and released in coordination with the operation of the clutch.

As a further means of keeping the housing 16 compact, the operating yoke 27 for clutch member 12 lies normally in alignment with shaft 7, and therefore opposite the greatest projection of gear 9 and adjacent to gear 10.

Figures 2 and 3 of the drawings illustrate a modified form of the invention, especially adapted for use with heavy trucks. In this form of the invention diagonal gears $9^b$ and 10ᵇ are used in place of the bevel gears 9 and 10, and the shaft 7ᵇ is located below and hung from the beam 1. An additional brake pedal 29 is also provided, adjacent the usual service brake pedal and having operating connection with the rear wheel brakes and with a brake 30 upon the shaft 4ᵇ, the two brake rods 31 and 32 being connected to an equalizer yoke 33, connected in turn to the pedal 29. By this means, the clutches being released, either shaft 5 or 7 will be stopped.

A brace rod 34 connects the sleeve 18 with the frame 1 and relieves the other parts of the driving strain. The securing member 19 is preferably of the clip or U-bolt type, and my entire device may be applied to a car without special tapping or boring, since the bolts 17 are designed to enter the holes commonly provided in the transmission housing.

I claim:

1. A power take-off device for motor vehicles having forward and rear drive shaft sections, comprising a shaft journaled transversely of the vehicle frame and carrying a power wheel, a supplemental transmission device comprising a bevel gear fast upon the transverse shaft, a bevel gear loosely mounted upon the forward shaft section, a clutch element upon said last-named gear, a clutch element connected with the rear shaft section, and a clutch member slidably fixed to rotate with the forward shaft section, engageable with either of said clutch elements and lying entirely opposite the face of the fast bevel gear.

2. A power take-off device for motor vehicles having forward and rear drive shaft sections, comprising a shaft journaled transversely of the vehicle frame and carrying a power wheel, a supplemental transmission device comprising a bevel gear fast upon the transverse shaft, a bevel gear loosely mounted upon the forward shaft section, a clutch element upon said last-named gear, a clutch element connected with the rear shaft section, a clutch member slidably fixed to rotate with the forward shaft section, engageable with either of said clutch elements and lying entirely opposite the face of the fast bevel gear, and an operating yoke for said slidable clutch member having a neutral position in alignment with said transverse shaft.

In testimony whereof I affix my signature in presence of two witnesses.

R. F. CRAWFORD.

Witnesses:
C. L. WIGHT,
ELVENA KREGAR.